(12) United States Patent
Williams

(10) Patent No.: US 7,197,962 B2
(45) Date of Patent: Apr. 3, 2007

(54) LIGHT BULB INSTALLATION AND REMOVAL DEVICE

(76) Inventor: Steven Andrew Williams, 1995 Ferndale Pl., Thousand Oaks, CA (US) 91360

( * ) Notice: Subject to any disclaimer, the term of this patent is extended or adjusted under 35 U.S.C. 154(b) by 12 days.

(21) Appl. No.: 10/979,102

(22) Filed: Nov. 2, 2004

(65) Prior Publication Data

US 2005/0145077 A1    Jul. 7, 2005

Related U.S. Application Data

(60) Provisional application No. 60/518,992, filed on Nov. 12, 2003.

(51) Int. Cl.
*H01K 3/32* (2006.01)

(52) U.S. Cl. .................... 81/53.12; 81/3.42

(58) Field of Classification Search .............. 81/53.11, 81/53.12, 3.4, 3.44, 3.42, 128, 53.1; 294/19.1, 294/19.2, 28–30, 31.1, 106; 157/16, 21
See application file for complete search history.

(56) References Cited

U.S. PATENT DOCUMENTS

| | | | | |
|---|---|---|---|---|
| 1,601,877 A * | 10/1926 | Nilsson et al. | ............. | 81/53.12 |
| 1,895,638 A * | 1/1933 | Melling | ............. | 81/3.42 |
| 2,478,471 A * | 8/1949 | Edlund | ............. | 81/3.42 |
| 2,521,011 A * | 9/1950 | Hoskins | ............. | 81/3.42 |
| 2,779,224 A * | 1/1957 | Coggburn | ............. | 81/3.44 |
| 2,873,777 A * | 2/1959 | Thostenson | ............. | 157/16 |
| 3,119,290 A * | 1/1964 | Ivie | ............. | 81/128 |
| 3,240,086 A * | 3/1966 | Way | ............. | 81/111 |
| 3,369,431 A * | 2/1968 | Srsen | ............. | 81/52 |
| 3,866,966 A * | 2/1975 | Skinner, II | ............. | 294/106 |
| 3,901,547 A * | 8/1975 | Skinner, II | ............. | 294/88 |
| 4,033,205 A * | 7/1977 | Hoskins | ............. | 81/3.42 |
| 4,598,942 A * | 7/1986 | Shum et al. | ............. | 294/106 |
| 4,663,203 A * | 5/1987 | Coffin, Sr. | ............. | 428/12 |
| 4,750,538 A * | 6/1988 | du Quesne | ............. | 157/1.24 |
| 5,379,666 A * | 1/1995 | Held | ............. | 81/53.1 |
| 6,098,972 A * | 8/2000 | Klimach et al. | ............. | 269/156 |
| 6,217,094 B1 * | 4/2001 | Hanaduka et al. | ............. | 294/106 |
| 2004/0025641 A1 * | 2/2004 | Sugano | ............. | 81/53.11 |
| 2004/0216561 A1 * | 11/2004 | Bitonto et al. | ............. | 81/3.4 |
| 2005/0229750 A1 * | 10/2005 | Duke | ............. | 81/3.4 |

* cited by examiner

*Primary Examiner*—D. S. Meislin

(57) ABSTRACT

An object gripping device for removing and installing bulbs and other objects. The device has around its circumference three or more vertical gripping posts. The device uses a sun gear and planetary gears to transmit the user's twisting motion to a gripping force applied equally around the object's circumference. Furthermore, the gearing ratio can be adjusted to create more or less leverage or gripping force applied to the bulb or object. The device could also be applied to gripping any object that is semi-cylindrical in shape. For instance, a robot can use the invented gear system to pick up or grip objects in a factory, laboratory, hospital, space exploration or home setting. Instead of a handle used to rotate the sun gear a drive shaft can be attached. An electric motor, a gas or diesel engine, a hydraulic power pack can rotate the drive shaft.

5 Claims, 5 Drawing Sheets

LIGHT BULB INSTALLATION AND REMOVAL DEVICE

CROSS REFERENCE TO RELATED APPLICATIONS

This application is based on and claims priority to Provisional Patent Application No. 60/518,992, entitled "Object Gripping Device", filed on Nov. 12, 2003.

BACKGROUND

The invention relates to the field of devices for gripping objects with a circular circumference and even curved vertical surfaces, such as light bulbs. More specifically, the invention relates to a device for gripping and turning for the installation and removal of objects such as light bulbs, and is particularly suitable for installing and removing light bulbs in high and/or poorly accessible environments, such as recessed can lighting fixtures.

One purpose of the invention is to provide a device to grip a light bulb or any round object securely around its circumference while it is being removed, moved and installed by the user. The device of the invention can be mounted on the end of a rod, e.g., telescoping, allowing the user to access light bulbs in ceilings, and other high or difficult to access areas.

The device could also be applied to gripping any object that is semi-cylindrical in shape. For instance, a robot can use the invented gear system to pick up or grip objects in a factory, laboratory, hospital, space exploration or home setting. Instead of a handle used to rotate the sun gear a drive shaft can be attached. An electric motor, a gas or diesel engine, a hydraulic power pack can rotate the drive shaft.

The inventor has found that the existing, off the shelf light bulb changer do not perform to expectations. The existing design is difficult to attach onto a light bulb, and it grips the light bulb poorly which sometimes.resultsin.breaking the bulb andxequiring the user to utilize a ladder-in removing the bulb anyways. Breaking bulbs obvious safety and time costs, such as broken glass in someone's eyes, or on the floor clean up, obtaining a ladder and pliers to remove the broken bulbfrom the socket. It would be advantageous to have a light bulb changing device that can be used by an individual desiring to safely change light bulbs without a ladder in locations such as ceilings and outdoor roof eves that grips tightly without breakage.

BRIEF SUMMARY

The device of the invention improves household and workplace safety by eliminating the need for an individual to climb a ladder to remove and install a light bulb in a ceiling, roof eve, and the like. The device can be used with a handle, e.g., telescoping, to reach light bulbs in high locations.

The device can be particularly useful in reaching bulbs in recessed can lighting fixtures, which offers limited accessibility to the light bulb. Certain designs of recessed can lighting may cause an individual difficulty when trying to grip the light bulb with their fingers, since the space between the light bulb and the recessed can is typically only about 0.64 cm (0.25 inches) or less. The device's vertical gripping arms are designed slender enough to slip between the can and the light bulb. The device grips the light bulb or an object around its circumference with three or more vertical gripping posts. These vertical gripping posts are shaped to be slightly concave to increase the contact area and thusly the friction on the bulb or object gripped. To grasp the round object, the device uses a sun and planetary gears to transmit the user's twisting motion, via the handle, motor, or drive shaft, to a gripping force applied around the bulb's circumference. Furthermore, the gearing ratio can be adjusted to create more or less leverage force applied to the bulb or object.

If desired, at the end of the handle that the user grasps, a hollowed out rubber or plastic or other resilient material stopper can be installed. This resilient end can be used to loosen the broken light bulb bases from a socket, when there would be otherwise no bulb for the gripping posts to grip. The rubber stopper is adapted to be jammed into the broken bulb filament and then loosen.

DETAILED DESCRIPTION

Figure 1:
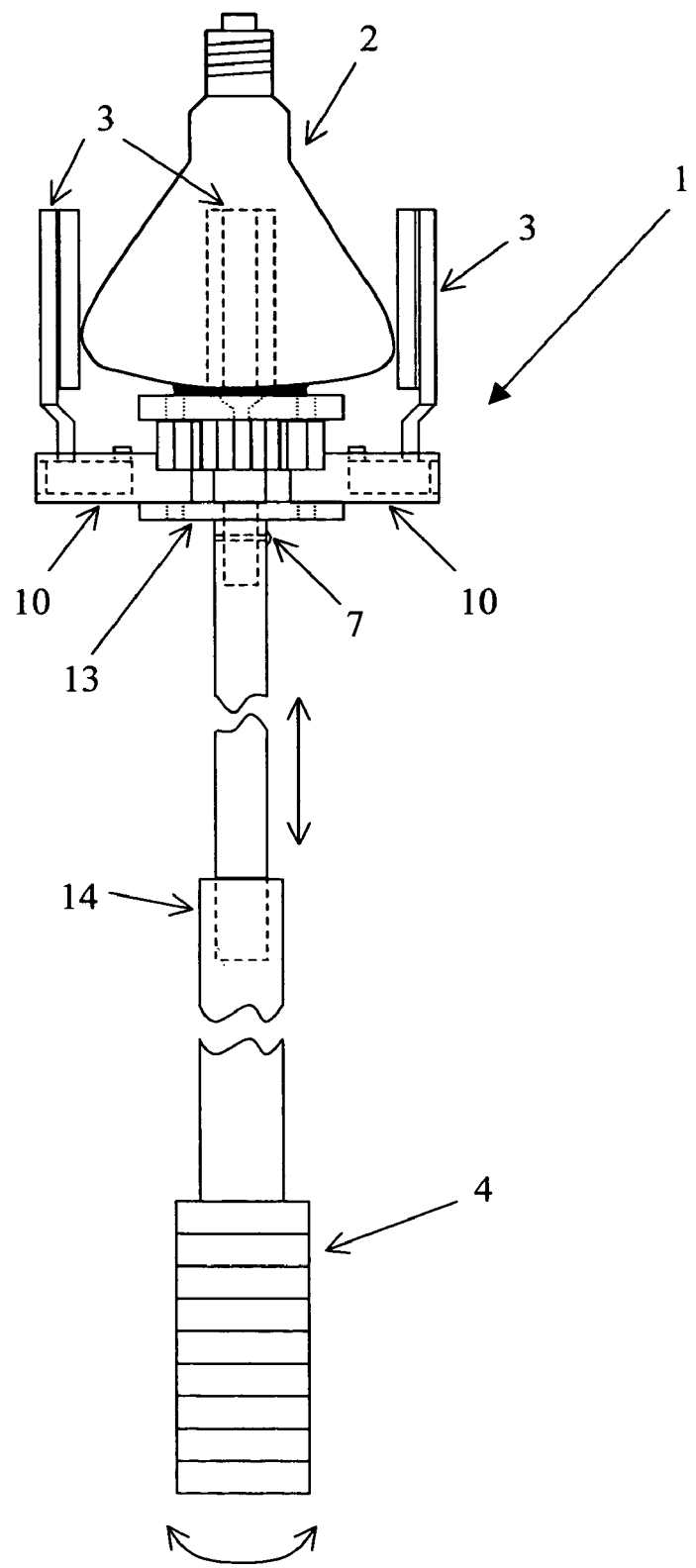
FIG. 1 is an elevated view of an exemplary embodiment of the object gripper of the invention used to grip an exemplary light bulb.

FIG. 1 shows the object gripping device 1 gripping a light bulb 2, e.g. found in standard recessed lighting fixture (not shown). Three vertical gripping posts 3 are shown equally gripping the bulb 2. The three vertical gripping posts 3 can preferably each be spaced every 120 degrees around the bulb's circumference. The gripping device 1 is held and operated by the user with the telescoping handle 4. The handle 4 extends or retracts from point 14. To tighten or loosen a bulb 2 from its fixture, the handle 4 is rotated in the direction desired by the user, either clockwise or counter-clockwise. While a telescoping handle is shown, the handle need not include the telescoping feature.

Figure 2:
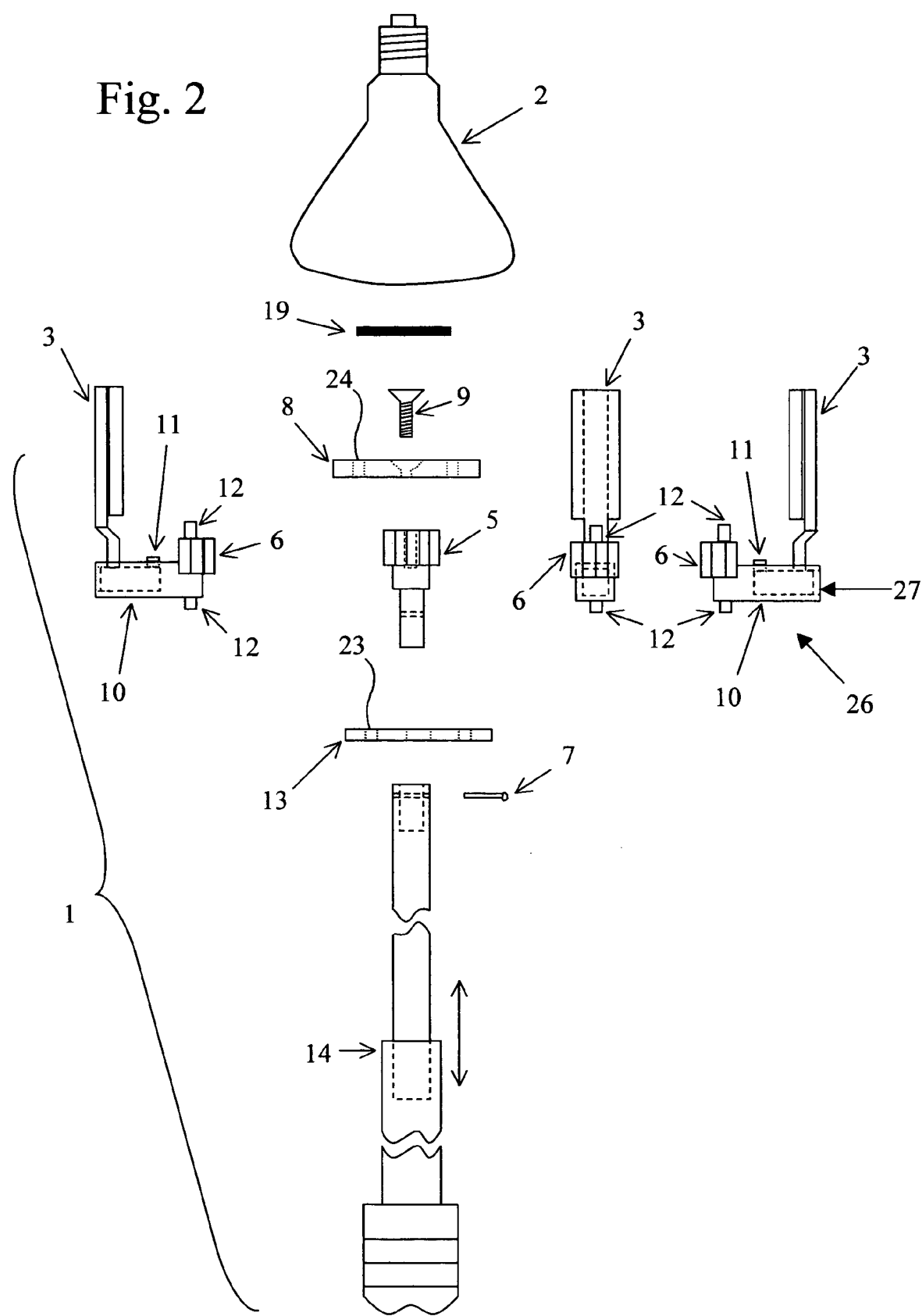
FIG. 2 is an exploded view of the object gripper of FIG. 1.

FIG. 2 is an exploded view of the gripping device 1. As can be seen, there are relatively few components in the object gripping device 1. The gear that is driven by the user and affixed to the handle 4 is a sun gear 5, and is in the center of the object gripping device 1. The sun gear 5 is attached and secured the handle 4 with a rivet, screw 7 (or other attachment). The base plate 13 is held in place by the sun gear 5 being attached (e.g., with a rivet 7) to the handle 4. A top plate 8 is secured to the sun gear 5 by means of a screw, rivet 9 (or other attachment), but with enough free play to allow the sun gear 5 to rotate freely relative to the top plate 8. Optionally, there can be provided a roller bearing or other friction reducing structure or material (not shown) between the sun gear 5 and the top plate 8 and base plate 13 to reduce friction. The top surface of the top plate 8 that makes contact with the bulb 2 preferably has a pad 19 with a high friction coefficient. This is important, since this friction secures (from slipping) the object gripping device 1 while initially engaging the device to grip a bulb 2. Planetary gear units 6 are pivotally held in place to the base plate 13 and top plate 8 by an upper pin 12A and lower pin 12B pivotally passing through apertures 23 in the base plate 13 and apertures 24 in the top plate 8. Other known mechanism and structures can also be used. As the handle 4 is rotated in the direction the user requires, either clockwise or counterclockwise depending if loosening or tightening the bulb 2, the sun gear 5 rotates a planetary gear 6 of a gripping arm unit 26 (in the opposite direction). Each gripping arm unit 26 has a planetary gear 6 that is integrated, molded, etc., to a horizontal arm 10 which has at least one vertical gripping post 3 mounting thereon and extending upwardly from there. A mounting position adjuster 11 is provided to permit the vertical gripping post to move closer or farther away from the planetary gear 6 depending on the size of the bulb 2 or object being gripped. The mounting position adjuster 11 can comprise a simple spring loaded push button or the like. It is preferable that outer ends 27 of the horizontal arms 10 not protrude past the vertical gripping post 3 since the clearance between the bulb 2 and the recessed light fixture (not shown) can at times be rather minimal. The gears 5, 6 can be made from a moderate to high strength material, including high impact plastic or fiberglass reinforced nylon, since not much torque will be typically be required to loosen a light bulb 2. For applications that require more strength, the gears 5, 6 can be made from metal. When the planetary gears 6 are rotated by the sun gear, this causes the horizontal arm 10 upon which the vertical gripping posts 3 are mounted to swing and thusly arc inwardly, thereby gripping the bulb 2 or other object to be gripped. The three vertical gripping posts 3 will equally grip the bulb 2, and each of the three vertical gripping posts 3 are spaced each 120 degrees around the bulb's circumference. Because of the vertical gripping post's 3 equal spacing around the bulb 2 or object, the gripping device 1 has tremendous gripping strength and friction. The surface of the vertical gripping posts 3 that contact the bulb 2 or other object preferably have a concave profile to increase the contact surface area and at least this concave portion is coated or made with a material with a high friction coefficient.

Figure 3:
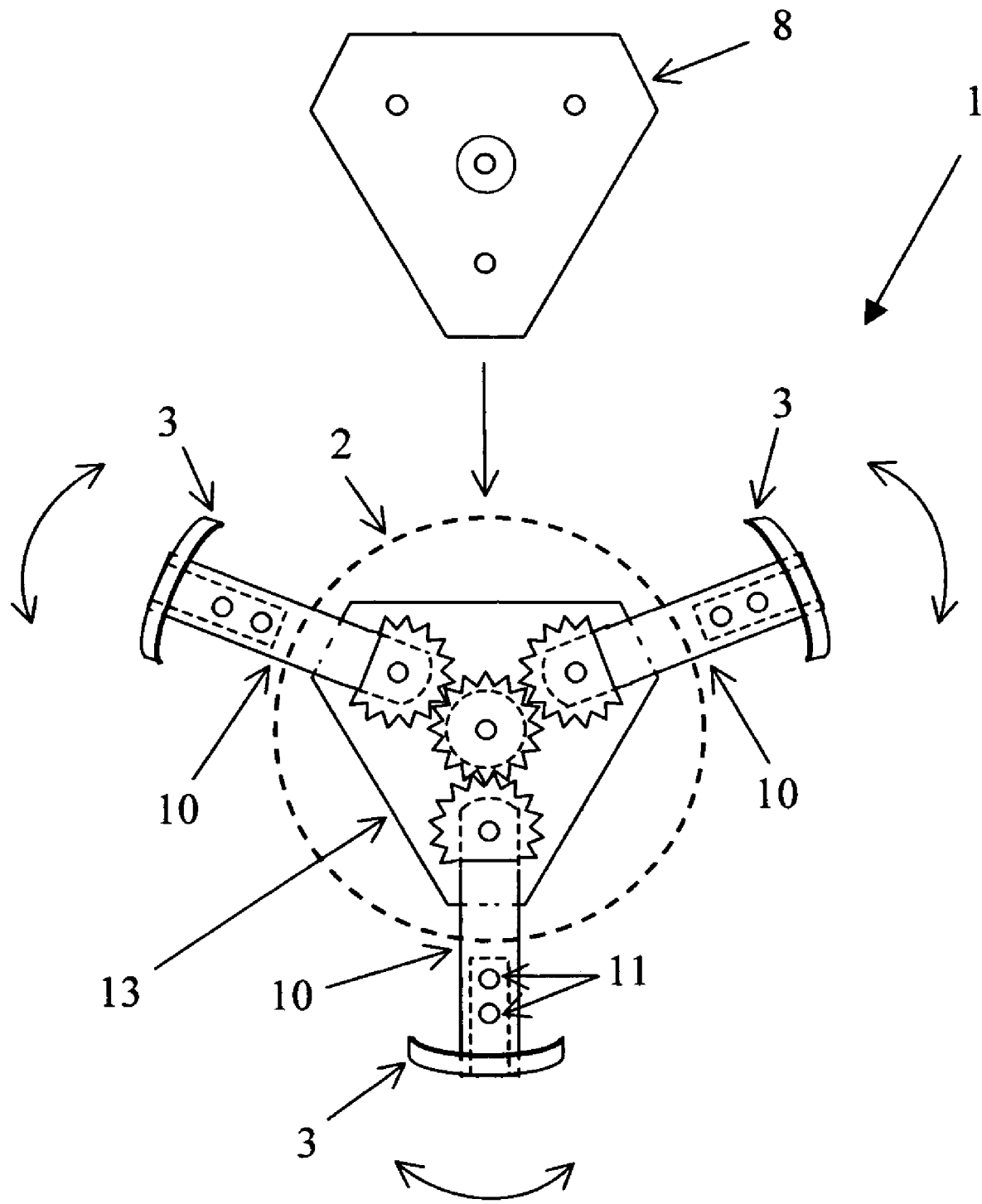
FIG. 3 is a top view of the object gripper of FIG. 2 in the "open" position.
Figure 4:
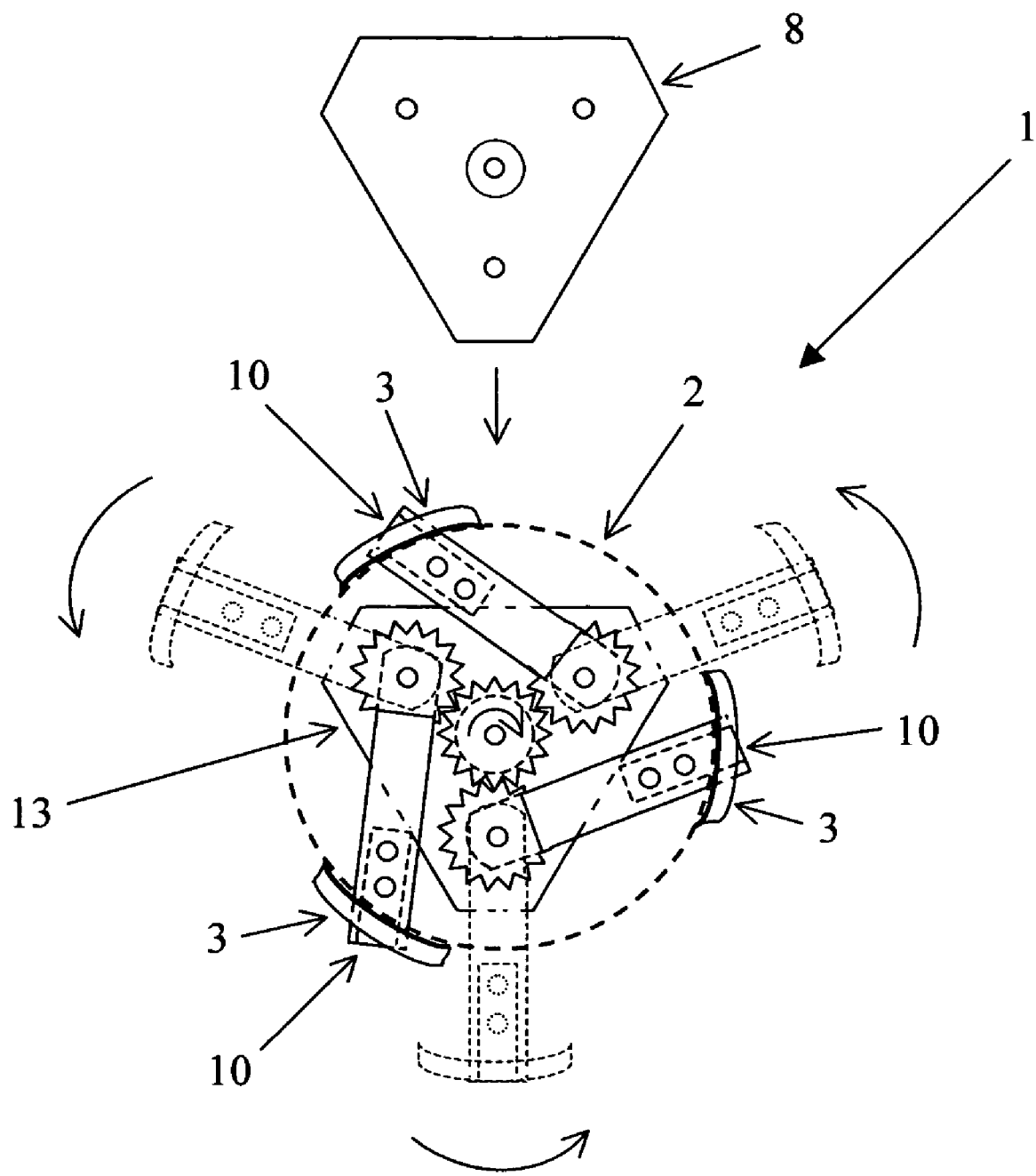
FIG. 4 is a top view of the object gripper of FIG. 2 in the "closed" position, gripping a light bulb.

FIG. 3 shows a top view of the assembled gripper device 1 in the "open" position, before gripping the bulb 2. The bulb 2 is shown in the center, simply shown as an outlined circle for an unobstructed view of the gripper device 1. The handle 4 is also omitted for clarity. In this open orientation, the three vertical posts 3 are not in contact with the perimeter of the bulb. By selecting a sun gear with a lesser number of teeth and/or using a planetary gear with a greater number of teeth, to thereby decrease the gear ratio, the torque of the device will increase, and conversely, by selecting a sun gear with a greater number of teeth and/or using a planetary gear with a lesser number of gear, to thereby increase the gear ratio, the torque of the device will decrease FIG. 4 shows the gripping device 1 gripping a bulb 2, shown for simplicity in phantom as an outlined circle for an unobstructed view. This figure clearly shows how the vertical gripper posts 3 will arc inwardly to grip the bulb 2 or other object tightly. The vertical gripping posts 3 are allowed to flex or swivel along its vertical axis to make full, unbiased contact with the bulb 2 or the object being gripped. As the handle 4 is rotated in the direction the user requires (e.g. clockwise or counterclockwise), the sun gear 5 rotates the planetary gear 6 of a gripping arm unit 26 in the opposite direction and the vertical gripping posts 3 mounting thereon and extending upwardly there from will swing into contact with the bulb and by continuing to turn the handle 4, the turning form will exert sufficient gripping and turning force to turn the bulb and permit its removal or installation.

Figure 5:
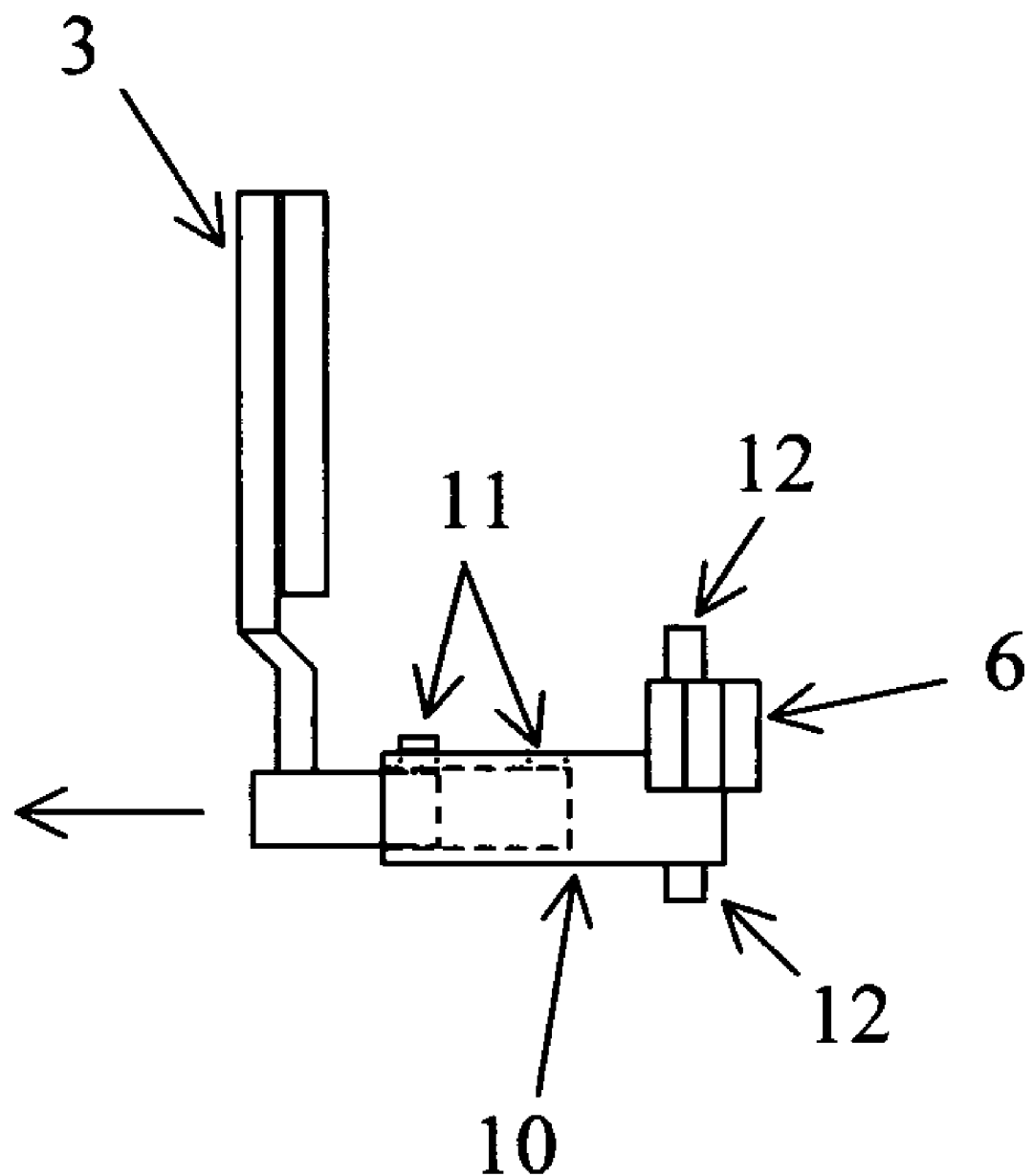
FIG. 5 is an elevated detail view showing an exemplary embodiment of the expanded horizontal arm and vertical gripping posts of FIG. 2.

FIG. 5 shows a gripping arm unit 26 and planetary gear 6 integrated to a horizontal arm 10 with its vertical gripping post 3 in an extended position (e.g., to accept a larger light bulb). As can be seen the outer mounting position adjuster 11 is utilized for this purpose.

The drawings in the foregoing description are not intended to represent the only form of the invention in regard to the details of its construction and manner of operation. In fact, it will be evident to one skilled in the art that modifications and variations can be made without departing from the spirit and scope of the invention. Although specific terms have been employed, they are intended in a generic and descriptive sense only and not for purposes of limitation.

I claim:

1. A device to grip various sized light bulbs, comprising:
   a pole portion;
   a plurality of gears operated by the pole, whereby increased rotational resistance from a gripped light bulb results in an increased grip force;
   a plurality of gripping arm units, each having an attached gripping post, wherein by rotating the pole, each gripping arm unit rotates and thereby tightens in a direction opposite to which the pole is rotated; and
   an upper and a lower base plate which retain the plurality of gears and said gripping arm units, wherein the upper base plate has a top surface that is provided with a high friction material to anchor the gripping device stationary with a bulb to be gripped.

2. The gripping device as in claim 1, wherein each of the gripping posts include a contact surface that is of a concave shape in order to maxiimize their contact area and friction coefficient with the light bulb to be gripped.

3. The gripping device as in claim 1, wherein the pole is extendable.

4. The gripping device as in claim 1, wherein at least three gripping arm units are located equally around a center gear.

5. The gripping device as in claim 1, wherein the gripping posts are permitted to flex or swivel along its vertical axis of the gripping posts to facilitate and maintain their contact on the light bulb during arcing movement of the gripping arm units.

* * * * *